United States Patent Office 3,472,762
Patented Oct. 14, 1969

3,472,762
PROCESS FOR THE SEPARATION OF MIXTURES OF HYDROCARBONS HAVING DIFFERENT DEGREES OF SATURATION
Alan Goldup, West Byfleet, and Michael Thomas Westaway, Ashford, England, assignors to The British Petroleum Company Limited, Britannic House, London, England, a corporation of England
No Drawing. Filed Apr. 25, 1967, Ser. No. 633,405
Claims priority, application Great Britain, Apr. 27, 1966, 18,388/66
Int. Cl. C10g 5/04
U.S. Cl. 208—308      18 Claims

ABSTRACT OF THE DISCLOSURE

Mixtures of all cyclic or all non-cyclic hydrocarbon components having different degrees of saturation are separated by contacting in liquid or vapour form with a compound having the basic nuclear structure:

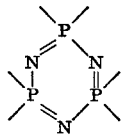

to form a complex with one or more of the components, and recovering the mixture depleted in these components and the components from the complex.

---

This invention relates to a process for the separation of hydrocarbons.

Allcock and Siegel (J.A.C.S., 1964, vol. 86, 5140) disclose that the compound tris-(o-phenylenedioxy) phosponitrile trimer, (alternatively known as tris-(o-phenylenedioxy) cyclotriphosphazene, and hereinafter referred to as TPNT), forms molecular inclusion compounds with certain organic liquids. The selective sorption of one component of the liquid mixtures, heptane-cyclohexane, hexane-cyclohexane, hexane-benzene and carbon tetrachloride-benzene, is also mentioned. It will be noted that each of these comprises a cyclic and a non-cyclic component differing in molecular constitution.

We have now found that preferential sorption occurs on phosphonitrilic materials as hereinafter set forth, from the liquid or vapour phase, of one or more hydrocarbon components of a mixture, the preferentially sorbed component having certain structural differences from the other components.

The invention accordingly consists in a hydrocarbon separation process which comprises contacting a vapour or liquid mixture comprising substantially all cyclic or substantially all non-cyclic components having different degrees of saturation with a compound which forms an inclusion complex more readily with one or more of the components than with the other components, and having the basic nuclear structure:

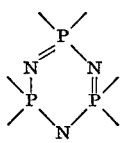

hereafter referred to as a PNT-type structure, so as to preferentially sorb one or more components, and recovering a mixture depleted in said sorbed components.

The preferentially sorbed hydrocarbons may be recovered by desorption from the inclusion complex in a separate operation and the sorbent re-used.

The term "degree of saturation" includes fully saturated and unsaturated hydrocarbons. A poly-olefin is regarded as having a smaller degree of saturation than a mono-olefin, and the degree of saturation of the side-chain of a substituted aromatic hydrocarbon is not considered. The components of the mixture preferably contain up to 9 carbon atoms per molecule.

Operation in the vapour phase is preferred.

Mixtures separable by the process of the invention may contain for example, mono-olefins and paraffins, or aromatics and naphthenes, or mono-olefins and di-olefins. the separation of mixtures of straight chain and cyclic hydrocarbons is outside the scope of this invention, as is the separation of alkyl-aromatic from alkenyl-aromatic hydrocarbons.

It is believed that in the presence of hydrocarbon molecules with which the PNT-type structure complexes (guest molecules) the phosphonitrilic material (host material) form a structure having periodically recurring voids into which the guest molecules may fit.

As an example, in the case of TPNT, it is believed that regular channels of hexagonal cross-section are formed in the presence of the guest molecules. The forces retaining the guest molecules within the channels are weak and thus guest molecules may readily be removed from the complex. On removal of the guest molecules it is believed that the TPNT crystal lattice is disrupted, to reform in the presence of further guest molecules.

Molecular shape is an important factor in determining the extent of sorption, i.e. the ease with which a guest molecule is accommodated within the PNT-type structure. One facet of molecular shape is the cross-section, but this, although important is not the only criterion of sorption. We have for example found that TPNT sorbs p-xylene preferentially to ethylbenzene, although these may be regarded as having very similar cross-sections.

The preferred compound of PNT-type structure is TPNT. It has the formula:

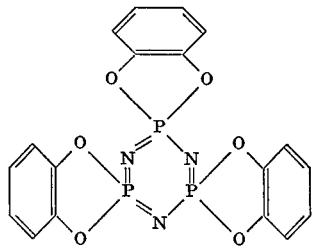

Other PNT-type compounds which may form inclusion complexes of the type described are o-phenylenediamino cyclotriphosphazene and 2,3-naphthyldioxy cyclotriphosphazene.

TPNT itself may be prepared by reacting phosphonitrilic chloride trimer $(PNCl_2)_3$ with catechol. Phosphonitrilic chloride trimer may be prepared, together with other phosphonitrilic derivatives, by reaction of ammonium chloride with phosphorus pentachloride. TPNT is a white crystalline solid melting at 244–245° C.

The PNT-type material may be used in its free state or may be pelleted or deposited on an inert support. Suitable supports are, for example, ground firebrick, diatomaceous earth, silica gel, alumina or porous glass. It may be preferable to silanise the support. A particularly suitable, and preferred supported sorbent comprises PNT-type material incorporated with one or more cured thermosetting resins resistant to hydrocarbons under the conditions of use of the sorbent. Such a supported sorbent is described, interalia, in our co-pending British patent application No. 56354/66.

The PNT-type material may also be deposited as a thin film on a laminar support, or on a fibrous support. We have found that the PNT-type material may be deposited from solution in an organic solvent by stirring and refluxing with the support material under nitrogen, cooling, filtering and drying under vacuum. We have deposited PTNT from xylene solution on 80–100 BSS mesh silanized diatomaceous earth in this way. We have also obtained TPNT loadings of from 5 to 30% wt. on 8–12 BSS mesh ground firebrick by saturating it with a 6% w./v. solution in xylene, evaporating off the solvent, and repeating the operation until the required loading was reached.

The support material should be so chosen as to provide, inter alia, a low pressure drop across the reactor containing the PNT-type material and a high loading of PNT-type material per unit volume of the reactor, but care should be taken that the rate of equilibration of the PNT-type material with the hydrocarbon material is not too low.

The sorbate may be removed from the PNT-type material by displacement with another sorbate or by elution with an inert gas or liquid or by reduction in the ambient pressure, i.e. reduction in the vapour pressure of the sorbed material (the so-called "pressure swing" technique). Desorption can also be obtained by increasing the temperature. Which method is chosen will depend on factors of which those skilled in the art will be aware, such as the cost of inert gas elution or the provision of means to reduce the pressure in the pressure swing process, but in the preferred vapour phase process a pressure reduction desorption technique is preferred, and a particularly suitable means of achieving such pressure reduction is by condensation of the desorbed material. A process for production of the necessary vacuum for desorption by direct condensation of the effluent from the sorbent bed in a cyclic process is described in our co-pending British application No. 15,304/66.

Processes employing any of the methods of desorption described are desirably operated on a cyclic basis, i.e. one cycle of complex formation and recovery of the complexed material is followed by another. We have found that satisfactory results may be obtained by the use of a fixed bed of sorbent, although this is not essential. The PNT material may complex with up to about 10% by wt. of its weight of hydrocarbon material, and it has been found most economic to operate at or near saturation capacity, removing only a portion of the sorbed molecules in each cycle. The feedstock to the sorbent bed may be diluted or undiluted. In the case of a vapour phase process an inert carrier gas, such as nitrogen, may be used.

A purging stage may optionally be employed between the sorption and desorption steps. This purging stage will use an inert gas or liquid, or purging will take place by pressure reduction, as appropriate, and by this means surface sorbed and non-sorbed material is removed. The purging stage may be omitted, for example, when the volume of the reactor in which desorption occurs is large enough, and the quantity of material removable by purging is small enough, for the relative concentration of such material to be neglected. In the case of the pressure reduction process it is essential that the sorption, purge and desorption pressures should decrease in this order, but it is not necessary that these pressures should be distinct and uniform. Purging and desorption may be conveniently carried out as a continuous process by progressive pressure reduction.

Any suitable combination of sorption, purging and desorption techniques may be used, if desired. One example of such a combined process would be a vapour phase sorption, followed by purging with an inert gas, and finally desorption by pressure reduction. Where a diluted feed is used purging may be carried out by reduction in the feed concentration. The use, in a vapour phase process, of a feed diluted with inert gas enables the pressure at any stage in the process to exceed the vapour pressure of the hydrocarbon components of the feed at the process temperature. If the pressure rises above the hydrocarbon vapour pressure when an undiluted feed is used then liquidfication will occur, which may be undesirable.

It may be desirable, in addition, to employ a number of sorbent beds in succession and to pass the effluent from one bed, enriched in one or more components of the feed to that bed, to a further bed.

Tables 1, 2 and 3 below show the ranges from which the reaction conditions of a liquid phase-inert liquid desorption process, a vapour phase-inert gas desorption process, and a vapour phase-pressure reduction desorption process, respectively, may be chosen. It will be realised that the cycle ranges take into account the use of a diluted or undiluted feed and the use or not of a purge stage.

The following are common to all three types of processes:

Ratio bed length to diameters, from 30:1 to 1:1
Particle size, from 4 to 100 mesh BSS
Temperature, 15° C. up to 20° C. below the decomposition temperature of the PNT-sorbed component complex for all stages

TABLE 1

Inlet pressure, from 10 to 5000 p.s.i.a.
Cycle:
    Sorption, from 0.1 to LHSV+inert liquid (up to 50 LHSV)
    Optional purge, inert liquid (up to 50 LHSV)
    Desorption, inert liquid (up to 50 LHSV)
Cycle times:
    Sorption, from 10 secs. to 60 minutes
    Purge, from 10 secs. to 60 minutes
    Desorption, from 10 secs. to 5 hours

TABLE 2

Pressure, from 10 to 1000 p.s.i.a.
Cycle:
    Sorption, from 0.1 to 10 LHSV+inert gas (up to 1000 GHSV)
    Optional purge, inert gas (up to 1000 GHSV)
    Desorption, inert gas (up to 1000 GHSV)
Cycle times:
    Sorption, from 10 secs. to 60 minutes
    Purge, from 10 secs. to 60 minutes
    Desorption, from 10 secs. to 5 hours

TABLE 3

Cycle:
    Sorption, from 0.1 to 10 LHSV+inert gas (up to 1000 GHSV)
Pressure:
    Sorption, from 10 to 1000 p.s.i.a.
    Optional purge, from 0.1 to 100 p.s.i.a.
    Desorption, from 0.01 to 10 p.s.i.a.
Cycle times:
    Sorption, from 10 secs. to 60 minutes
    Purge, from 10 secs to 60 minutes
    Desorption, from 10 secs. to 5 hours In Tables 2 and 3 the feed space velocity is calculated as the liquid, although the feed is in the vapour phase. The actual values chosen from the above ranges will depend, among other factors, on the nature of the feed to the process, the purity of the product(s) and the nature of the PNT material used, for example, its decomposition temperature, whether it is supported or not, and the nature of the support.

The following are the preferred ranges of conditions for a vapour phase process, using TPNT for the separation of components of a mixture comprising n-paraffins and linear mono-olefins. Table 4 shows the conditions for an inert gas desorption process and Table 5 gives those for a pressure reduction desorption process. The ranges of ratio of bed length to diameter, particle size, temperature, and cycle times shown in Table 4 are also applicable to Table 5.

TABLE 4

Ratio bed length to diameter, from 20:1 to 4:1
Particle size, from 4 to 100 BSS mesh
Temperature, from 60 to 220° C.
Pressure, from 10 to 500 p.s.i.a.
Cycle:
    Sorption, from 0.2 to 5 LHSV+inert gas (up to 500 GHSV)
    Optional purge, inert gas (up to 500 GHSV)
    Desorption, inert gas (up to 500 GHSV)
Cycle times:
    Sorption, from 30 secs. to 15 minutes
    Purge, from 10 secs. to 15 minutes
    Desorption, from 10 secs. to 150 minutes

TABLE 5

Pressure:
    Sorption, from 10 to 500 p.s.i.a.
    Optional purge, from 0.1 to 20 p.s.i.a.
    Desorption, from 0.01 to 5 p.s.i.a.
Cycle:
    Sorption, from 0.2 to 5 LHSV+inert gas (up to 500 GHSV)

If an undiluted feed is used the upper limit of pressure in both Tables 4 and 5 is about 150 p.s.i.g., since this is the vapour pressure of the feed at the decomposition temperature of TPNT. The upper limits of pressure shown are applicable when a diluted feed is used.

In a cyclic process using a number of fixed beds the cycle times for sorption, purge, and desorption should be in simple ratios to each other to facilitate switching.

The invention is illustrated by the following examples.

EXAMPLE 1

A feedstock having the following composition by weight was used in this example.

| | Percent |
|---|---|
| n-Hexane | 39.0 |
| Hexene-1 | 39.0 |
| Cyclohexane | 0.9 |
| Methylcyclopentane | 12.2 |
| 3-methylpentene-2 | 6.1 |
| 2,3-dimethylbutene-2/2-methylpentene-2 | 2.3 |
| n-Pentane | 0.5 |

The constituents shown as a mixture were inseparable by gas-liquid chromatography.

The feedstock was passed over a material consisting of 18% wt. TPNT on 8–12 BSS mesh ground firebrick in a 200 ml. reactor in the vapour phase. The weight of TPNT was 17 gms. The reactor conditions were as follows, a gas displacement technique being used.

TABLE 6

Temperature, 110° C.
Cycle:
    Sorption, 0.5 LHSV+7GHSV nitrogen
    Purge, 190 GHSV nitrogen
    Desorption, 190 GHSV nitrogen
Cycle times:
    Sorption, 1 minute
    Purge, 1 minute
    Desorption, 3 minutes
Yield desorbate (UTC/hr.), approximately 4%

| Desorbate composition: | Percent wt. |
|---|---|
| n-Hexane | 59.2 |
| Hexene-1 | 34.8 |
| Methylcyclopentane | 4.4 |
| n-Pentane | 1.6 |

EXAMPLE 2

Selectivity studies were carried on various synthetic blends as follows:

50 gms. of sublimed TPNT were contacted with 0.5 mls. of liquid material. After 2 hours the solid TPNT-sorbed component complex was filtered off and dried in the atmosphere overnight. A sample of the solid was placed in a small heater coil situated in a gas stream on the inlet side of a gas-liquid chromatograph column. By applying a small current to the coil the complex was decomposed and the included material swept onto the column and analysed.

The mixtures were equivolume blends, and the desorbate compositions are percentages by weight.

(1)

| | |
|---|---|
| n-Hexane | 63 |
| Hexene-1 | 37 |

(2)

| | |
|---|---|
| n-Heptane | 63 |
| Heptene-1 | 37 |

(3)

| | |
|---|---|
| Benzene | 29 |
| Cyclohexane | 71 |

We claim:

1. A hydrocarbon separation process which comprises contacting a vapour or liquid mixture comprising substantially all cyclic or all non-cyclic hydrocarbons having different degrees of saturation, with a phosphonitrilic compound selected from the group consisting of tris-(o-phenylenedioxy) cyclotriphosphazene, tris-(o-phenylenediamino) cyclotriphosphazene and tris-(2,3-napthyldioxy) cyclotriphosphazene, so as to preferentially sorb one or more of the more saturated hydrocarbons, and recovering a mixture depleted in said sorbed hydrocarbons.

2. A hydrocarbon separation process as in claim 1 wherein the phosphonitrilic compound is tris-(o-phenylenediamino) cyclotriphosphazene.

3. A hydrocarbon separation process as in claim 1 wherein the phosphonitrilic compound is tris-(2,3-napthyldioxy) cyclotriphosphazene.

4. A process as claimed in claim 1, in which the preferentially sorbed hydrocarbons are recovered from the said compound in a separate operation.

5. A process as claimed in claim 1, in which the components of the mixture contain up to 9 carbon atoms per molecule.

6. A process as claimed in claim 1, in which the said compound is incorporated with one or more cured thermosetting resins resistant to hydrocarbons under the conditions of use of the sorbent.

7. A process as claimed in claim 4, in which the sorbed material is removed from the said compound by displacement with another sorbate, by elution with an inert gas or liquid, by reduction in the ambient pressure or by increases in the ambient temperature.

8. A process as claimed in claim 7, carried out in the vapour phase in which description is effected by reduction in the ambient pressure, such reduction being obtained by condensation of the desorbed material.

9. A process as claimed in claim 1 operated on a cyclic basis at or near the saturation capacity of the said compound, only a proportion of the sorbed molecules being removed in each cycle.

10. A process as claimed in claim 1, in which the feed to the sorbent bed is diluted with an inert gas in the case of a vapour phase process or an inert liquid in the case of a liquid phase process.

11. A process as claimed in claim 7 in which a purging stage is interposed between the sorption and desorption steps, purging being carried out by the same means as that used for desorption.

12. A process as claimed in claim 11 in which the purging and desorption are achieved successively by reduction in the ambient pressure, it being provided that the ambient pressure decreases in the order; sorption, purge, desorption.

13. A process as claimed in claim 11 in which purging and desorption are achieved by elution with an inert gas or liquid.

14. A hydrocarbon separation process which comprises contacting a vapour or a liquid mixture comprising substantially all cyclic or substantially all non-cyclic hydrocarbons having different degrees of saturation, with tris-(o-phenylenedioxy) cyclotriphosphazene on an inert solid support, so as to preferentially sorb one or more of the more saturated hydrocarbons, and recovering a mixture depleted in said sorbed hydrocarbons.

15. A hydrocarbon separation process which comprises contacting a vapour or a liquid mixture comprising substantially all cyclic or substantially all non-cyclic hydrocarbons having different degrees of saturation, with tris-(o-phenylenedioxy) cyclotriphosphazene, so as to preferentially sorb one or more of the more saturated hydrocarbons, and recovering a mixture depleted in said sorbed hydrocarbons.

16. A liquid phase process as claimed in claim 15 wherein the conditions of operation are as follows:

Inlet pressure _____ From 10 to 5000 p.s.i.a.
Cycle:
    Sorption _____ From 0.1 to 10 LHSV. Plus up to 50 LHSV of an inert liquid.
    Optional purge ___ Inert liquid, up to 50 LHSV.
    Desorption _____ Inert liquid, up to 50 LHSV.
Cycle times:
    Sorption _____ From 10 secs. to 60 minutes.
    Purge _____ From 10 secs. to 60 minutes.
    Desorption _____ From 10 secs. to 5 hours.

17. A vapour phase process as claimed in claim 15 wherein the conditions of operation are as follows:

Pressure _____ From 10 to 1000 p.s.i.a.
Cycle:
    Sorption _____ From 0.1 to 10 LHSV. Plus up to 1000 GHSV of an inert gas.
    Optional purge ___ Inert gas, up to 1000 GHSV.
    Desorption _____ Inert gas, up to 1000 GHSV.
Cycle times:
    Sorption _____ From 10 secs. to 60 minutes.
    Purge _____ From 10 secs. to 60 minutes.
    Desorption _____ From 10 secs. to 5 hours.

18. A vapour phase process as claimed in claim 15 in which the conditions of operation are as follows:

Cycle:
    Sorption _____ Form 0.1 to 10 LHSV. Plus up to 1000 GHSV of an inert gas.
Pressure:
    Sorption _____ From 10 to 1000 p.s.i.a.
    Optional purge ___ From 0.1 to 100 p.s.i.a.
    Desorption _____ From 0.01 to 10 p.s.i.a.
Cycle times:
    Sorption _____ From 10 secs. to 60 minutes.
    Purge _____ From 10 secs. to 60 minutes.
    Desorption _____ From 10 secs. to 5 hours.

References Cited

Allcock et al., JACS 86 (1964), pp. 5140 to 5144.

HERBERT LEVINE, Primary Examiner

U.S. Cl. X.R.

252—426; 260—551, 674, 677, 681.5, 927

UNITED STATES PATENT OFFICE
CERTIFICATE OF CORRECTION

Patent No. 3,472,762　　　　　　　　　　　　　　　October 14, 1969

Alan Goldup et al.

It is certified that error appears in the above identified patent and that said Letters Patent are hereby corrected as shown below:

Column 1, lines 36 and 37, "phosponitrile" should read -- phosphonitrile --. Column 2, line 12, "the" should read -- The --; line 19, "form" should read -- forms --. Column 4, line 30, "from 0.1 to LHSV" should read -- from 0.1 to 10 LHSV --. Column 6, line 59, "description" should read -- desorption --.

Signed and sealed this 27th day of October 1970.

(SEAL)
Attest:

Edward M. Fletcher, Jr.　　　　　　　　　　　WILLIAM E. SCHUYLER, JR.
Attesting Officer　　　　　　　　　　　　　　　Commissioner of Patents